(No Model.)
H. I. MASON.
CLUTCH PULLEY.
No. 418,205. Patented Dec. 31, 1889.
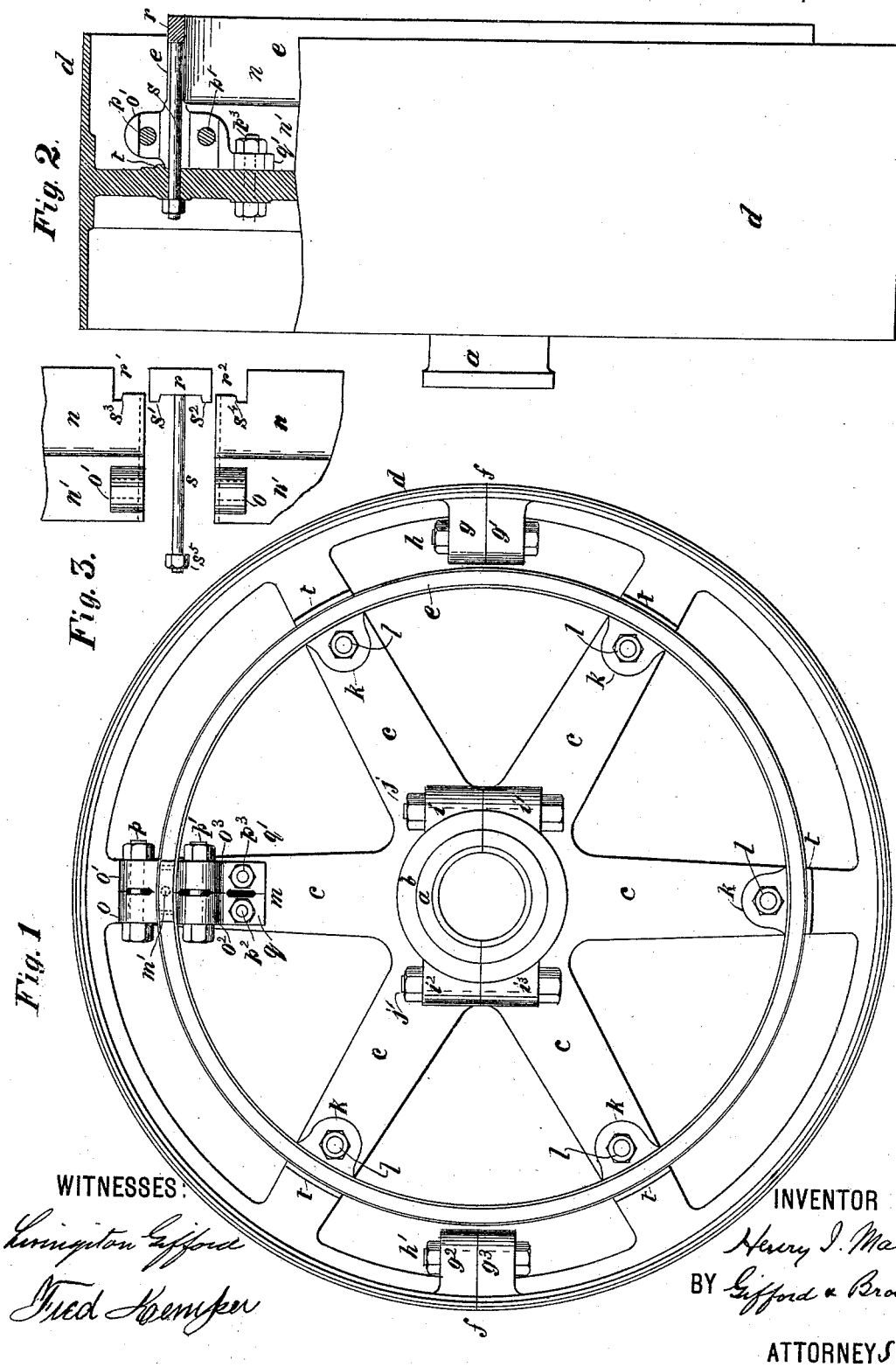
WITNESSES:
Livingston Gifford
Fred Kemper
INVENTOR
Henry I. Mason
BY Gifford & Brown
ATTORNEYS

UNITED STATES PATENT OFFICE.

HENRY I. MASON, OF CUYAHOGA FALLS, OHIO, ASSIGNOR TO THE FALLS RIVET AND MACHINE COMPANY, OF SAME PLACE.

CLUTCH-PULLEY.

SPECIFICATION forming part of Letters Patent No. 418,205, dated December 31, 1889.

Application filed August 3, 1889. Serial No. 319,654. (No model.)

*To all whom it may concern:*

Be it known that I, HENRY I. MASON, of Cuyahoga Falls, Ohio, have invented a new and useful Improvement in Clutch-Pulleys, of which the following is a specification.

Heretofore clutch-pulleys have been constructed with a friction-flange secured thereto inside the rim of the pulley adapted for engagement with the jaws of the clutch mechanism, as illustrated, for instance, in Letters Patent of the United States No. 373,425, dated November 22, 1887, granted to the Falls Rivet Company. By reason of the fact, however, that the friction-flange and also the pulley were respectively in one piece, it was necessary in mounting the pulley upon a shaft to dismount the shaft and slide the pulley on longitudinally.

The object of my present invention is to so construct the friction-flange and the pulley that each may be separated sufficiently to admit of mounting the pulley upon the shaft from a lateral direction.

My invention consists in splitting the friction-flange and combining the same with a split pulley. It also consists in the mechanism by which the parts of the friction-flange on each side of the split are joined together, so as to make a practically continuous friction surface.

In the drawings, Figure 1 is an end view of the friction-pulley. Fig. 2 is a side view thereof partly in section. Fig. 3 is a detail of mechanism uniting the flange.

$a$ is the bushing of the pulley. $b$ is the hub. $c$ are the arms. $d$ is the rim. $e$ is the friction-flange.

The pulley is split on the axial plane $f\,f$, which passes through the rim, the hub, and the bushing, dividing the whole into two parts. This enables each half of the pulley to be placed separately in position upon the shaft and then the two to be fastened together.

To provide for fastening the two halves of the pulley together, lugs $g\,g'\,g^2\,g^3$ project inwardly from the rim of the pulley on either side of the dividing-plane. Bolts $h$ and $h'$ unite the lugs which are adjacent to each other on opposite sides of the plane of division.

$i, i', i^2$, and $i^3$ are lugs projecting outwardly from the hub of the pulley on either side of the plane of division, and the lugs which are adjacent to each other on opposite sides of said plane are secured together by the bolts $j$ and $j'$.

By placing these bolts $h\,h'\,j\,j'$ in position and tightening them the two halves of the pulley, after being placed separately upon the shafting, will be held securely together, so that the whole pulley will operate practically as though in one piece.

Opposite the arms $c$ of the pulley the friction-flange $e$ is provided with inwardly-projecting lugs $k$, which are secured to the arms by the bolts $l$, so that the friction-flange can be attached to and detached from the pulley at will. At one side of the shaft, as at $m$, the friction-flange is split on an axial plane, preferably about at right angles with the plane on which the pulley is split. The split of the flange comes, as illustrated, opposite one arm of the pulley. For some distance back from the outer edge, the friction-flange is turned down, so as to produce a zone $n$ somewhat thinner than the zone $n'$ next the pulley.

It is intended that the jaws of the clutch shall only engage with the zone $n$ of the friction-flange. On either side of the split the lugs $o$ and $o'$ project outwardly and are drilled so as to be adapted to be secured together by the bolt $p$. On either side of the split the lugs $o^2$ and $o^3$ project inwardly from the zone $n'$ of the friction-flange, and are drilled so as to be adapted to be secured together by the bolt $p'$. $q$ and $q'$ are inward extensions from the lugs $o^2$ and $o^3$, respectively, which fit against the face of the pulley-arm $c$ and are secured thereto by the bolts $p^2$ and $p^3$. The friction-flange is first cast in one piece and turned off, so as to make the proper surface on both sides for clutch-jaws—such as are shown, for instance, in patent of the United States No. 383,104, dated May 22, 1888, granted to H. C. Crowell. A piece corresponding with the piece $r$, Figs. 2 and 3, is then cut out of the flange in such location that the opening thus formed will lie one-half on each side of what is to be the division-plane, as indicated at $r'\,r^2$, Fig. 3. A hole $m'$ is then bored through the flange parallel with its axis from the inner to the outer edge, said hole having its axis in what is to be the division-plane, as indicated in dotted lines, Fig. 1. By driving a wedge-shaped tool into this hole the flange will be cracked or split in the plane required, so that it can be sprung apart at the split sufficiently to admit of being passed over the shaft laterally, so as to be placed in position after the pulley is mounted. The free ends of the flange on the opposite sides of the split are then secured together by the bolts $p\,p'$, through the lugs $o\,o'$ and $o^2\,o^3$. The flange is then connected with the pulley-arms by the bolts $l$, $p^2$, and $p^3$.

It still remains to provide mechanism whereby the free ends of the zone $n$ on opposite sides of the split will be combined together, so as to move and operate practically as one continuous piece. This is accomplished by the bolt $s$, which is fitted into the hole $m'$, already referred to, and is provided at one end with the head $r$, corresponding with the opening $r'\,r^2$ cut at the outer edge of the flange. The piece $r$ is provided with the ears $s'\,s^2$, which are reversely inclined on their adjacent edges, so as to have a tendency, by co-operating with similar inclines $s^3\,s^4$ on the friction-flange, to draw the two free ends of the friction-flange together as the nut on the bolt $s$ is tightened. The inner end of the bolt $s$ extends through the pulley-arm $c$, as shown in Fig. 2, and is provided at its extremity with a nut $s^5$, by which it is secured in position.

The friction-flange having been placed in position around the shaft and secured to the pulley, as before described, the bolt $s$ is placed in position and the nut $s^5$ tightened, the result being that the bolt-head $r$ occupies the cut $r'\,r^2$, made from the edge of the flange, and effectually prevents the separation in a circumferential direction of the inner edge of the flange. At the same time the bolt $s$, occupying the hole $m'$, prevents the motion of the edges of the flange on opposite sides of the split upon each other in a radial direction, thus holding the flange solidly in all directions and presenting to the clutch-jaws an even continuous surface, practically as though of one piece of metal.

$t$ is a shoulder on each of the pulley-arms just outside of the friction-flange, which serves to steady the flange and maintain its position.

I believe that I am the first person to construct a friction-clutch pulley capable of being applied to the shaft laterally, a matter of great difficulty to be successful, by reason especially of the necessity of keeping the friction-surface of the flange practically intact when in operation, and I therefore do not desire to limit myself to the details of construction, but desire to cover all modifications thereof which come within the general scope of my invention.

I claim—

1. In a friction-clutch pulley, the combination, with a split pulley, of a split friction-flange, substantially as described.

2. In a friction-clutch pulley, the combination, with a split pulley, of a flange split only on one side of the shaft, substantially as described.

3. In a friction-clutch pulley, the combination, with a pulley split on an axial plane, of a friction-flange split on a plane forming an angle with the first-named plane, substantially as described.

4. In a friction-clutch pulley, the combination, with a pulley having radial arms and split on an axial plane passing between said arms, of a friction-flange split opposite one of said arms, the ends of the friction-flange on the opposite side of the split being secured to the same arm, substantially as described.

5. In a friction-clutch pulley, the combination, with a split pulley, of a split friction-flange separate from said pulley and provided with lugs, whereby the same may be secured to said pulley, substantially as described.

6. In a friction-clutch pulley, in combination with the pulley having the shoulders $t$ on its face, a split friction-flange adapted to fit against said shoulders and provided with means of attachment to the pulley, substantially as described.

7. In a friction-clutch pulley, the friction-flange composed of zones $n$ and $n'$, of different thicknesses, split and provided with means whereby the ends on opposite sides of the split may be secured together, substantially as described.

8. In combination, the split pulley, the split friction-flange, means whereby said flange may be secured to said pulley, and the lugs projecting from the flange on opposite sides of the split, whereby the free ends of the flange may be secured together, substantially as described.

9. In combination, the split pulley, the split flange, the lugs projecting from the flange on opposite sides of the split for connecting the free ends thereof together, and the extensions $q$ and $q'$ from said lugs adapted for securing the same to the arms of the pulley, substantially as described.

10. In combination with the pulley, the split friction-flange, the bolt $s$, embedded in the edge of the flange on each side of the split, whereby said edges are prevented from moving on each other in a radial direction, and means whereby said edges are held together in a circumferential direction, substantially as described.

11. In combination, the pulley, the split friction-flange, the piece let into the edge of said flange on both sides of the split and provided with a projection interlocking with the flange on each side of the split, whereby the edges thereof are held together in a circumferential direction, and means whereby the edges thereof are held together in a radial direction, substantially as described.

12. In combination, the pulley, the split friction-flange, the piece provided with a projection interlocking with the flange on each side of the split, whereby the edges thereof are held together in a circumferential direction, and means whereby the edges thereof are held together in a radial direction, substantially as described.

13. In combination, the pulley, the split friction-flange, the piece provided with inversely-inclined projections interlocking, respectively, with inclined projections on the flange on opposite sides of the split, whereby the free ends of said flange are drawn and maintained together in a circumferential direction, and means whereby the same are held together in a radial direction, substantially as described.

14. In combination, the pulley, the split friction-flange, the bolt passing logitudinally through said flange and provided with a head having projections which interlock with the flange on opposite sides of the split, substantially as described.

15. In combination, the pulley, the split flange, the lugs arranged on opposite sides of the split to assist in securing the free edges of the flange together, the bolt passing longitudinally through said flange and provided with a head interlocking with said flange on opposite sides of the split, substantially as described.

16. In combination, the pulley, the split friction-flange, the piece secured by suitable means to the edge of the flange on one side of the split, and provided with a projection whereby it interlocks with and holds the edge of the flange on the opposite side of the split, and means whereby the surfaces on opposite sides of the split are prevented from separating in a radial direction, substantially as described.

HENRY I. MASON.

Witnesses:
   THOS. F. WALSH,
   MABEL EDSILL.